United States Patent
Leroy et al.

(10) Patent No.: US 8,120,227 B2
(45) Date of Patent: Feb. 21, 2012

(54) PROJECTING POLE ROTOR COMPRISING COIL END SUPPORT PLATES AND ROTARY ELECTRIC MACHINE COMPRISING ONE SUCH ROTOR

(75) Inventors: Virginie Leroy, Neuilly Plaisance (FR); Marc Tunzini, Versailles (FR)

(73) Assignee: Valeo Equipements Electriques Moteur, Creteil (FR)

( * ) Notice: Subject to any disclaimer, the term of this patent is extended or adjusted under 35 U.S.C. 154(b) by 272 days.

(21) Appl. No.: 11/993,135

(22) PCT Filed: Jun. 16, 2006

(86) PCT No.: PCT/FR2006/050565
§ 371 (c)(1),
(2), (4) Date: Dec. 28, 2009

(87) PCT Pub. No.: WO2007/003835
PCT Pub. Date: Jan. 11, 2007

(65) Prior Publication Data
US 2010/0090561 A1   Apr. 15, 2010

(30) Foreign Application Priority Data
Jun. 28, 2005 (FR) ..................................... 05 06578

(51) Int. Cl.
*H02K 9/22* (2006.01)
*H02K 1/22* (2006.01)

(52) U.S. Cl. ................... 310/216.114; 310/45; 310/214; 310/216.129; 310/270

(58) Field of Classification Search ........... 310/216.114, 310/216.115, 216.105, 87, 261, 214, 270, 310/216.129, 216.131, 216.133
See application file for complete search history.

(56) References Cited

U.S. PATENT DOCUMENTS

| 982,806 A | * | 1/1911 | Fechheimer | 310/40 R |
| 2,340,905 A | * | 2/1944 | Sigmund et al. | 310/88 |
| 2,831,991 A | * | 4/1958 | Perkins | 310/43 |
| 3,002,119 A | * | 9/1961 | Lindstrom | 310/260 |
| 3,247,585 A | * | 4/1966 | Little | 29/732 |
| 3,754,844 A | * | 8/1973 | Nusser et al. | 417/423.12 |
| 4,075,522 A | * | 2/1978 | Hoffman | 310/214 |
| 4,105,906 A | * | 8/1978 | Ade et al. | 310/87 |
| 5,122,705 A | | 6/1992 | Kusase et al. | |
| 5,341,058 A | * | 8/1994 | Kohler et al. | 310/87 |
| 5,449,963 A | * | 9/1995 | Mok | 310/270 |
| 6,002,219 A | | 12/1999 | Permuy | |

(Continued)

FOREIGN PATENT DOCUMENTS

DE   596337 C   4/1934

(Continued)

*Primary Examiner* — Burton Mullins
(74) *Attorney, Agent, or Firm* — Jacox, Meckstroth & Jenkins

(57) ABSTRACT

A rotor of a rotary electric machine comprising a rotor shaft, a stack of laminations, which is coaxial to the rotor shaft and which comprises at least two radially-projecting poles, a field coil which is wound around each pole, such that the ends of the coil project out axially in relation to each external axial end radial face of the lamination stack and two plates for supporting the lamination stack, which are disposed axially on either side of the stack, housings being provided in the internal radial face of each plate for receiving the coil ends. At least one of the housings comprises a contact surface with the external radial face of the associated coil end.

7 Claims, 3 Drawing Sheets

U.S. PATENT DOCUMENTS

| | | |
|---|---|---|
| 6,335,581 B1 * | 1/2002 | Warnke .......................... 310/89 |
| 6,445,095 B1 | 9/2002 | Liang et al. |
| 6,465,928 B1 * | 10/2002 | Shervington et al. ......... 310/270 |
| 6,731,028 B2 | 5/2004 | Ludwig et al. |
| 6,735,846 B2 * | 5/2004 | Du .................................. 29/596 |
| 6,744,158 B2 | 6/2004 | Liang et al. |
| 6,759,774 B1 * | 7/2004 | Griggs ............................ 310/87 |
| 6,784,586 B2 | 8/2004 | Akemakou |
| 6,849,987 B2 * | 2/2005 | Tornquist et al. ............. 310/270 |
| 6,897,597 B1 | 5/2005 | Armiroli et al. |
| 7,224,093 B2 | 5/2007 | Abadia et al. |
| 2002/0089242 A1 | 7/2002 | Liang et al. |
| 2002/0089244 A1 | 7/2002 | Liang et al. |
| 2002/0135245 A1 | 9/2002 | Derleth et al. |
| 2002/0158523 A1 | 10/2002 | Abadia et al. |
| 2002/0175589 A1 | 11/2002 | Takizawa et al. |
| 2003/0011257 A1 | 1/2003 | Akemakou |
| 2005/0151441 A1 * | 7/2005 | Ito et al. ........................ 310/234 |
| 2007/0069593 A1 | 3/2007 | Vasilescu et al. |

FOREIGN PATENT DOCUMENTS

| | | |
|---|---|---|
| EP | 0454039 A1 | 10/1991 |
| FR | 2745445 A1 | 8/1997 |
| FR | 2784248 A1 | 4/2000 |
| FR | 2855673 A1 | 12/2004 |
| FR | 2856532 A1 | 12/2004 |
| JP | 2001-45693 * | 2/2001 |
| WO | 0169762 A1 | 9/2001 |
| WO | 02054566 A1 | 7/2002 |

* cited by examiner

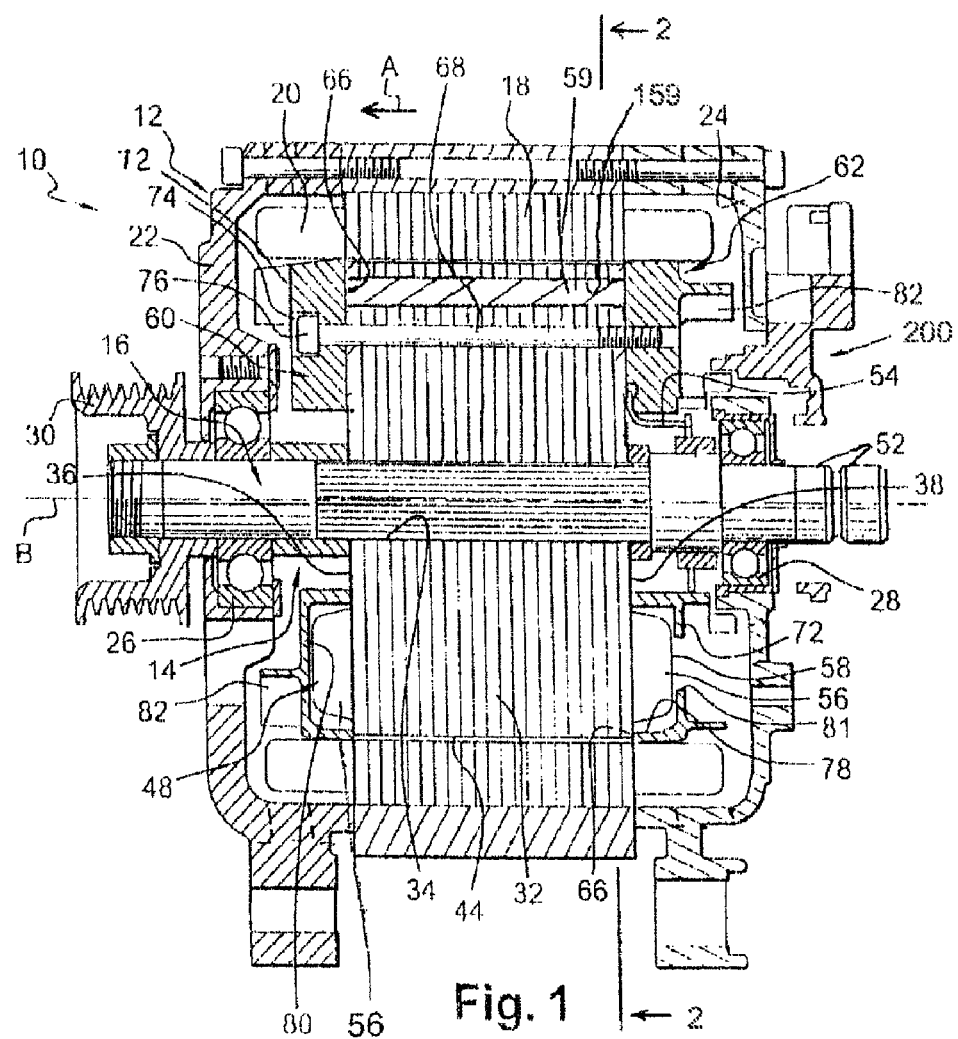
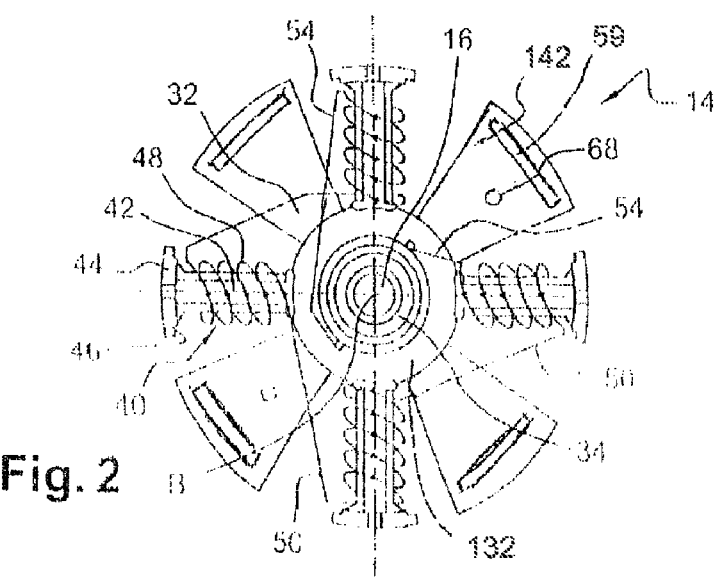

PROJECTING POLE ROTOR COMPRISING COIL END SUPPORT PLATES AND ROTARY ELECTRIC MACHINE COMPRISING ONE SUCH ROTOR

BACKGROUND OF THE INVENTION

1. Field of the Invention

The invention relates to a projecting pole rotor for a rotary electric machine and to a rotary electric machine comprising such a rotor.

The invention relates more particularly to a rotor of a rotary electric machine, in particular to an alternator or alternator-starter for a motor vehicle, comprising:
- a rotor shaft which is designed to be mounted such that it can rotate about its axis;
- a stack of laminations which is mounted coaxially on the rotor shaft and which comprises at least two radially projecting poles;
- a field coil which is wound around each pole so that axial end portions of the coil, referred to as coil ends, project axially with respect to each radial outer axial end face of the stack of laminations;
- two plates for supporting the stack of laminations, which plates are arranged axially on either side of the stack of laminations so that the inner radial faces of the plates bear against the radial outer axial end faces of the stack of laminations, housings being provided in the inner radial face of each plate to receive the coil ends.

2. Description of the Related Art

The documents WO-A-02/054566 and FR 2 856 532 show a typical prior art rotor.

In this type of rotor, the application of a voltage to the coils causes them to heat up. If the field coils are heated too much, this may be detrimental to the safety and efficiency of the machine.

This document proposes to cool the coils by providing an opening in the plates for supporting the stack of laminations, so as to leave the coil ends in contact with the air.

Furthermore, a fan is arranged on the outer radial face of each plate so as to move the air inside the machine when the rotor is rotating.

However, the blades of the fan are far away from the openings, thus preventing the air from circulating at the point of contact with the coil ends. The stagnant air contained in the opening between the fan and the coil end forms an insulating layer which prevents the heat from being dissipated. The coils are therefore not cooled in an optimal manner.

What is needed, therefore, is an improved system and rotor that improves cooling.

SUMMARY OF THE INVENTION

In order to remedy this problem, the invention therefore proposes a rotor of the type described above, wherein at least one of the housings has a contact surface with the outer radial face of the associated coil end.

According to other features of the invention, taken individually or in combination:
- the coil end is in contact with the housing via a heat-conductive substance;
- the heat-conductive substance is an electrical insulator;
- the heat-conductive substance is an impregnating varnish;
- the housing has a bottom which completely envelopes the coil end;
- the opposite housings which receive the ends of one and the same coil have a bottom which completely envelopes the coil end;
- one of the plates has a filling orifice which opens into the bottom of a housing so as to allow the injection of the liquid varnish around the two ends of the coil;
- each housing is filled with varnish so that there are no air bubbles in the housing;
- the plates are made of a heat-conductive non-magnetic material;
- each plate has cooling means which are able to evacuate the heat transmitted to the plate by the coil ends;
- the cooling means comprise a fan with blades;
- the blades of the fan are carried by an outer radial face of the plate;
- the blades are made of the same material as and in one piece with the plate;
- the blades are distributed non-symmetrically around the axis of rotation of the rotor,
- at least one of the plates is made in a single piece;
- the housings consist of hollows;
- at least one of the plates is made of at least a first inner section which comprises openings for the passage of the coil ends and a second outer section which comprises a bottom for forming the housings with the openings of the first section;
- the plates are axially connected to one another by tie-rods of axial orientation or tie-rods of axial orientation which are fixed by riveting;
- the tie-rods are fixed by screwing via a threaded fixing hole which is formed in one of the plates;
- at least one of the plates comprises holes for balancing in rotation.

The invention also proposes a rotary machine equipped with such a rotor.

These and other objects and advantages of the invention will be apparent from the following description, the accompanying drawings and the appended claims.

BRIEF DESCRIPTION OF THE DRAWINGS

Other features and advantages of the invention will become apparent upon reading the following detailed description, for the comprehension of which reference will be made to the appended drawings, in which:

FIG. 1 is a view in axial section of a rotary electric machine, which shows a rotor formed according to the teachings of the invention;

FIG. 2 is a view in radial section along the sectional plane 2-2 in FIG. 1;

DESCRIPTION OF THE PREFERRED EMBODIMENTS

Figure 3:
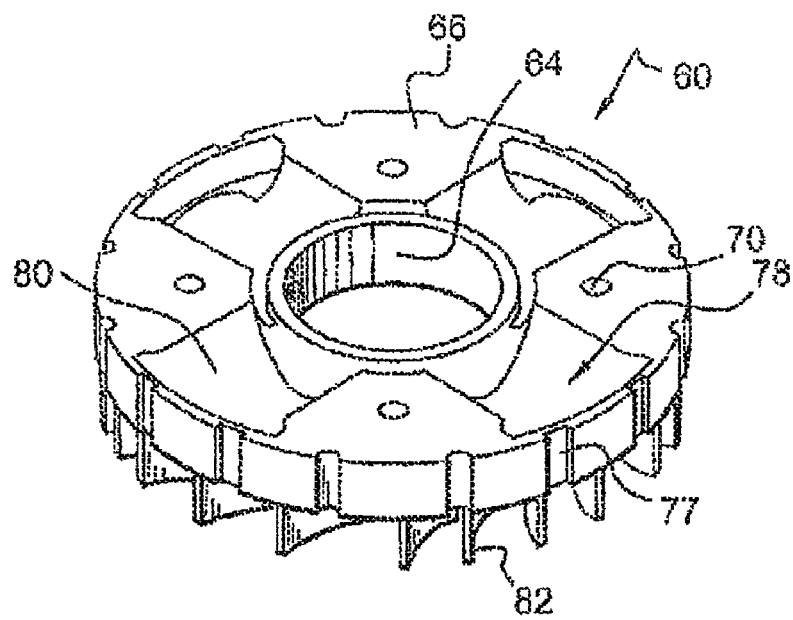
FIG. 3 is a perspective view which shows the inner face of a first plate of the rotor of FIG. 1.

In the rest of the description, there will be adopted by way of non-limiting example an axial orientation aimed from the back towards the front as indicated by the arrow "A" in FIG. 1, and radial orientations perpendicular to the axial orientation.

In the rest of the description, faces extending in a plane perpendicular to the axial orientation "A" will be referred to as radial faces.

In the text below, elements which are similar, analogous or identical will be designated by the same reference numerals.

FIG. 1 shows a rotary machine 10. The rotary machine 10 is for example an alternator or an alternator-starter. This machine 10 is preferably intended to be used in a motor vehicle.

It will be recalled that an alternator-starter is a rotary electric machine which is able to operate in a reversible manner, on the one hand as an electric generator in an alternator function and on the other hand as an electric motor in particular for starting the heat engine of the motor vehicle. Such an alternator-starter is described for example in the document WO-A-01/69762 (equivalent to U.S. Pat. No. 7,224,093), to which reference may be made for further details.

This machine 10 comprises essentially a casing 12 and, in the interior thereof, a rotor 14 which is rotationally fixed to a central rotor shaft 16 and an annular stator 18 which surrounds the rotor 14 in a manner coaxial to the shaft 16 of axis "B", which also constitutes the axis of the rotor 14.

The stator 18 comprises a body in the form of a stack of laminations with slots, for example of the semi-closed type, for mounting a stator coil 20 comprising a number of windings.

This stator coil 20 comprises for example a set of three-phase windings in a star or triangle shape, the outputs of which are connected to a bridge rectifier (not shown) comprising rectifying elements such as diodes or transistors of the MOSFET type, in particular when the machine 10 is of the reversible type and consists of an alternator-starter as described for example in the document FR-A-2.745.445 (and equivalent to U.S. Pat. No. 6,002,219), which is incorporated herein by reference and made a part hereof.

The windings of the stator coil 20 are obtained by means of a continuous wire which is electrically conductive and is covered with an insulating layer and is mounted in the relevant slots of the body of the stator 18.

According to one variant which is not shown, for better filling of the slots of the body of the stator 18, the windings of the stator coil 20 are made using rod-shaped conductors, such as pins, which are connected to one another for example by welding.

According to another variant which is not shown, in order to reduce the ripple factor and the magnetic noise, the stator coil 20 comprises two sets of three-phase windings so as to form a composite winding device of the stator 18, the windings being offset by thirty electrical degrees as described for example in the documents US-A1-2002/0175589, EP-0.454.039 and FR-A-2.784.248, all of which are incorporated herein by reference and made a part hereof. In this case, two bridge rectifiers are provided and all combinations of three-phase windings in a star and/or triangle shape are possible.

In general, the alternator is of the polyphase type and the bridge rectifier(s) make it possible in particular to rectify the AC current produced in the windings of the stator 18 to a DC current in particular for charging the battery (not shown) of the motor vehicle and supplying the loads and electric consumers of the on-board network of the motor vehicle.

As shown in FIG. 1, the shaft 16 of the rotor 14 is mounted such that it can rotate about its axis "B" of axial orientation in the stator 18 of the machine 10.

The casing 12 is in at least two parts, namely a front bearing 22 and a rear bearing 24. The bearings 22, 24 are of hollow shape and each carry in the centre a respective ball bearing 26, 28 for mounting the shaft 16 of the rotor 14 such that it can rotate.

Here, the casing 12 comprises an intermediate part (not provided with a reference numeral) which carries internally the body of the stator 18. This intermediate part is inserted axially between the bearings 22, 24, which each have a plurality of openings (not provided with a reference numeral) for internal ventilation of the machine by virtue of at least one fan which is integral with one of the axial ends of the rotor. In the embodiment of FIG. 1, this fan comprises blades 82 integral with a plate 60, 62 in the manner described below.

The shaft 16 of the rotor 14 carries at its front end a pulley 30 which is arranged outside the casing 12. The pulley 30 belongs to a device for transmitting movements via at least one belt (not shown) between the alternator and the heat engine of the motor vehicle.

A stack of laminations 32 is mounted coaxially on the shaft 16 of the rotor 14 in the casing 12, inside the stator 18. The stack of laminations 32 is more specifically mounted such that it rotates with the shaft 16. To this end, the stack of laminations 32 comprises a central axial orifice 34 which is force-fitted onto a knurled section of the shaft 16.

The stack of laminations 32 is formed of an axial stack of laminations which extend in a radial plane perpendicular to the axis "B" of the rotor shaft 16.

The stack of laminations 32 forms the body of the rotor 14 and is made of ferromagnetic material.

This stack of laminations 32 comprises here, as can be seen more clearly in FIG. 2, a cylindrical central core 132 and a circumferential alternating arrangement of arms 42, 142 projecting radially from the core 132. In one embodiment, these arms are made in one piece with the core 132. As a variant, at least one of the arms 42, 142 of arms is attached to the core 132, for example by a connection of the mortise and tenon type as described in the aforementioned document FR 2 856 532.

In the rest of the description, radial faces oriented towards the middle of the stack of laminations 32 will be referred to as inner faces whereas the radial faces oriented in an opposite direction will be referred to as outer faces.

Thus, the stack of laminations 32 is delimited axially by a first outer radial face 36 at the front end and by an opposite second outer radial face 38 at the rear end.

In a radial plane, the laminations of the stack of laminations 32 all have an identical contour. The contour of the laminations 32 is cut in a shape that is generally circular and comprises projecting poles 40 which are distributed regularly in a radial direction and project from the shaft 16 towards the outer periphery, as shown in FIG. 2. The stack of laminations 32 comprises at least two poles 40, and in the example shown in the figures it comprise four poles 40.

Each pole 40 consists of an arm 42 which, starting from the core 132, extends radially towards the outer periphery in the direction of the stator 18. The free end 44 of the pole 40 ends in a return 46 which projects circumferentially on either side of the arm 42. An annular air gap exists between the free end 44 of the poles 40 and the inner periphery of the body of the stator 18.

The function of the projecting return 46 of each pole 40 is to retain in the radial direction an electrically conductive field coil 48, which is wound around the radial arm 42 of each pole 40, against the centrifugal force to which the field coil 48 is subjected during the rotation of the rotor 14.

The field coils 48 of each pole 40 are electrically connected to one another by connecting wires 50, for example in series.

The field coils 48 are electrically supplied by a collector which comprises slip rings 52 which are arranged around a rear end of the shaft 16. This collector is made for example by overmolding an electrically insulating material on electrically conductive elements (not visible) which connect the rings 52 to an annulus (not provided with a reference numeral) which is electrically connected via wire connections 54 to the ends of the field coil(s) 48 of the rotor 14.

The slip rings 52 are electrically supplied via brushes (not shown) which belong to a brush holder and which are arranged so as to rub against the slip rings 52. The brush holder is generally arranged in the casing 12 and it is electrically connected to a voltage regulator.

Each field coil 48 is wound around the arm 42 of radial orientation of each pole 40 so that axial end portions or coil ends 56 of the field coil 48 project axially with respect to each outer radial face 36, 38 of the stack of laminations 32, as shown in FIG. 1. These projecting portions will hereinafter be referred to as the "coil ends" 56. More particularly, the outer radial face 58 of each coil end 56 is offset axially towards the outside with respect to the associated outer radial face 36, 38 of the stack of laminations 32.

Each pole 40 thus comprises a field coil 48 which itself comprises two opposite coil ends 56.

Here, the rotor 14 comprises four magnets 59. The magnets 59 here extend perpendicularly to a radius, that is to say in an orthoradial manner. The magnets 59 extend axially close to the outer periphery of the rotor 14. The magnets 59 are thus arranged regularly around the shaft 16 in a manner alternating with the poles 40. For this, the stack of laminations 32 of the rotor 14 comprises axial housings 159 for mounting the magnets.

The housings 159 are each formed in an aforementioned radial arm 142 which extends in a radially projecting manner from the core 132.

In FIG. 2 there is a circumferential alternating arrangement of four arms 42 and four arms 142. Of course, this depends on the specific application. In general, a small amount of play, referred to as an air gap, exists between the outer periphery of the arms 42, 142 and the inner periphery of the body of the stator 18.

Each series of arms 42, 142 comprises at least two diametrically opposed arms. The number of arms in each series may be greater than four. It is possible to envisage an arrangement without magnets 59 and therefore without arms 142. One and the same arm 142 may comprise two magnets, for example one rare-earth magnet and one ferrite magnet. A magnet may extend radially. All combinations are possible.

For the sake of simplicity, and by way of non-limiting example, it will be assumed in the rest of the text that four diametrically opposed arms are provided for each series of arms 42, 142, and therefore four poles 40, four coils 48 and at least four magnets 59. The arms 42, 142 are in this case distributed regularly around the circumference.

A first front plate 60 and a second rear plate 62 are mounted coaxially to the shaft 16 so as to axially clamp the stack of laminations 32 in order to hold the stacked laminations 32 and the magnets 59. More specifically, the plates 60, 62 close the housings 159 of the magnets 59 in the axial direction.

Figure 4:
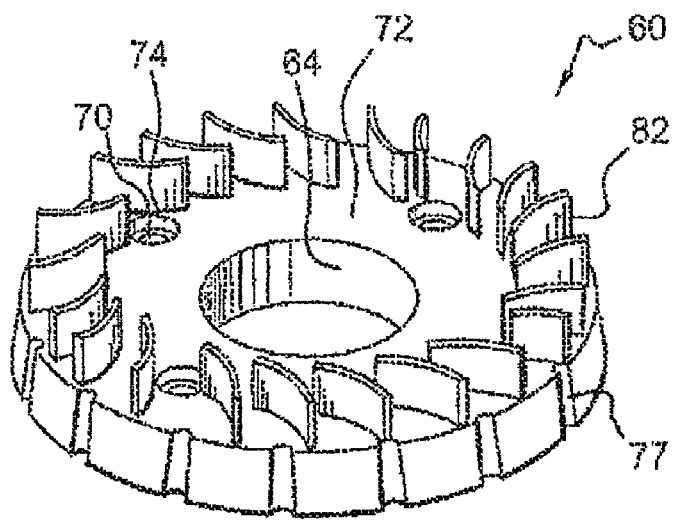
FIG. 4 is a perspective view from an opposite point of view to that of FIG. 3, which shows the outer face of the first plate.
Figure 5:
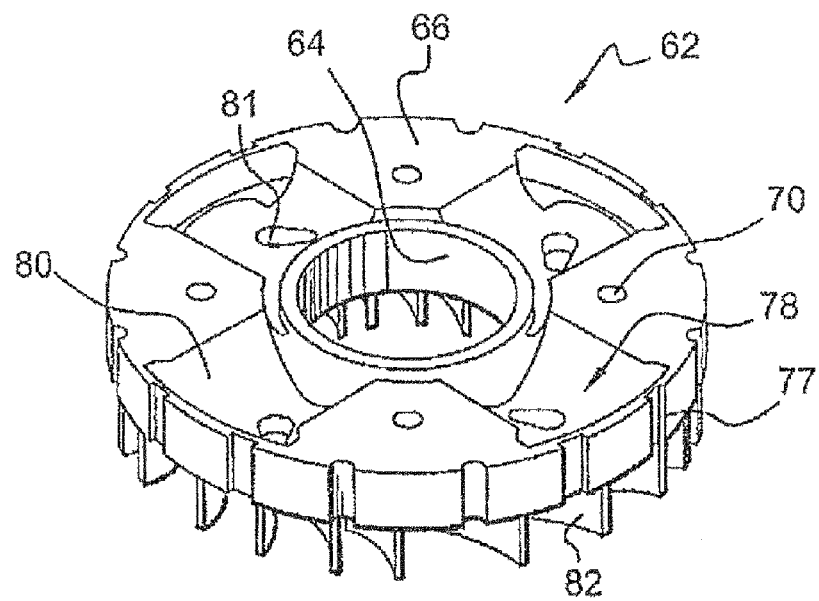
FIG. 5 is a view similar to that of FIG. 3, which shows the inner face of a second plate of the rotor of FIG. 1.
Figure 6:
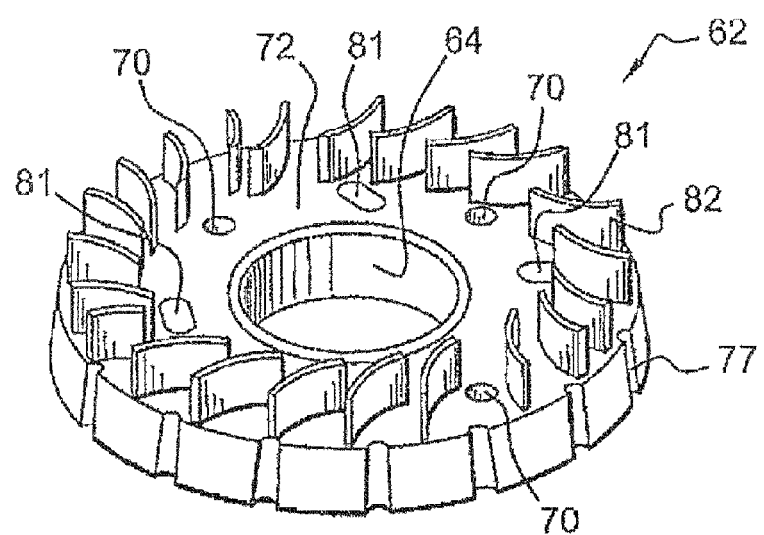
FIG. 6 is a view similar to that of FIG. 4, which shows the outer face of the second plate.

As shown in FIGS. 3, 4 and 5, each plate 60, 62 generally has the shape of a disc extending in a radial plane perpendicular to the axis "B" of the shaft 16. Each plate 60, 62 comprises a central orifice 64 for coaxial mounting on the shaft 16.

In order to axially hold the magnets 59 and the laminations forming the stack of laminations 32, the plates 60, 62 are arranged axially on either side of the stack of laminations 32 so that the inner radial faces 66 of the plates 60, 62 bear against the outer radial faces 36, 38 of the stack of laminations 32, as shown in FIG. 1.

The plates 60, 62 are fixed to one another by tie-rods 68 of axial orientation, of which there are at least two here. To this end, each plate 60, 62 comprises four holes 70 which are intended to allow the passage of each tie-rod 68. The arms 142 of the stack of laminations comprise holes (not provided with a reference numeral) so that the tie-rods 68 can axially pass through the stack of laminations 32 from the front plate 60 to the rear plate 62, in this case radially below the magnets 59 as can be seen in FIG. 1. Here, two diametrically opposed holes are not passed through by tie-rods, the tie-rods being two in number so as to reduce the number of parts.

The outer radial face 72 of the front plate 60 here comprises counterbores 74 in order to house the head 76 of each tie-rod 68.

The plates 60, 62 are made of heat-conductive material. The plates are made of metal for example.

In one embodiment, the plates are made of a non-magnetic material such as aluminum, which is a moldable material with good heat-conducting properties.

Advantageously, the outer peripheral edge of the plates 60, 62 facing the stator 18 comprises axial grooves 77 which open into the inner 66 and outer 72 radial faces of the plates 60, 62. These axial grooves 77 make it possible to renew the air contained radially between the stator 18 and the rotor 14.

Each plate 60, 62 also comprises housings 78 which are formed in their inner radial face 66. These housings 78 are designed to receive the projecting coil ends 56. Here, four housings 78 are provided. The housings 78 are distributed regularly around the circumference and therefore alternate around the circumference with flat portions which belong to the inner radial face 66 and make it possible to hold the magnets 59.

Here, the rotary electric machine is an alternator-starter and the rear plate 62 is configured so as to carry a target holder which is designed to allow associated sensors to detect the angular position of the rotor 14. The sensors are carried by a sensor carrier, the position of which is adjustable in the circumferential direction. Here, the target is read in the radial direction.

The target holder with its target and the sensors secured to a sensor carrier belong to means 200 for tracking the rotation of the rotor as described in the aforementioned document WO01/69762, to which reference may be made for further details.

The plate 62 thus comprises on its inner periphery a ring of axial orientation (not provided with a reference numeral) which carries the target holder at its free end. Here, the ring is integrally molded with the plate 62, which in this case is made from aluminum.

Of course, as a variant, the plate 62 does not have a ring and the rotary electric machine is an alternator.

This plate also comprises channels for housing the wires 50 and wire connections 54 as can be seen in part in FIG. 1.

According to the teachings of the invention, at least one of the housings 78 of at least one plate 60, 62 has a contact surface with the outer radial face 58 of the associated coil end 56, and the plates 60, 62 are made of a heat-conductive material.

In the embodiment shown in the figures, each housing 78 is closed by an outer radial bottom 80 which completely closes off the outer axial end of the housing 78 so that the coil end 56 is completely enveloped by the housing 78. The bottom 80 completely closes off the housing 78 so that the housing 78 does not open into the outer radial face 72 of the plates 60, 62. The housings 78 thus open only into the inner radial face 66 of each plate 60, 62.

The bottom 80 thus forms a contact surface with the outer radial face 58 of the coil end 56. The bottom in this case mates with the shape of the coil end 56. Thus, when the coil ends 56 are heated, their heat is transmitted to the plates in particular by conduction.

According to one variant of the invention, which is not shown, at least one bottom 80 does not completely close off the housing 78 and the housing 78 opens partially into the outer radial face 72 of the plate 60, 62.

As shown in FIG. 1, the housings 78 of the two plates 60, 62 here comprise a bottom 80. Thus, the two coil ends 56 of one and the same field coil 48 are adjacent to the bottoms 80 of two associated opposite housings 78 of each plate 60, 62, which thus make it possible to successfully evacuate the heat. In one embodiment, the coil ends 56 may be in direct contact with the bottoms 80. Here, the coil ends 56 are in contact with the bottoms 80 via a heat-conductive substance as will be described below.

The plates 60, 62, which are made here of aluminum, are advantageously made in a single piece, for example by molding. The housings 78 consist of hollows for example.

In order to prevent the field coil 48 from being destroyed, and to prevent any short-circuits in the field coil 48, the coil end 56 is in contact with the bottom 80 of the housing 78 via a substance (not shown) which conducts heat and does not conduct electricity, which substance protects the wires of the field coil 48. The substance here is a heat-conductive, electrically insulating, impregnating varnish. This varnish hardens by polymerization.

Advantageously, one of the plates 60, 62, here the rear plate 62, comprises filling orifices 81 which each open into the bottom 80 of an associated housing 78. These filling orifices 81 are designed to allow the impregnation of the liquid varnish around the field coil 48 associated with the housing 78, and more particularly around the two coil ends 56 of the field coil 48. The impregnation operation will be explained below.

Each plate 60, 62 also comprises cooling means which are able to evacuate the heat of the coil ends 56 which has been transmitted by conduction to the plates 60, 62 via the bottom 80 of the housings 78.

In the example shown in the figures, the outer radial face 72 of each plate 60, 62 comprises blades 82 forming a fan. Each blade 82 extends axially outwards from the outer radial face 72 of the associated plate 60, 62.

Advantageously, the blades 82 are made of the same material as and in one piece with the associated plate 60, 62.

Since the outer radial face 72 of the plates 60, 62 does not have an opening which opens into the housings 78, the arrangement of the blades 82 is advantageously independent of the arrangement of the housings 78.

Preferably, the blades 82 are arranged at the periphery of the outer radial face 72 of the plate 60, 62 in a non-symmetrical manner with respect to the axis "B" of the shaft 16 so as to produce turbulence in the surrounding air when the rotor 14 turns about its axis "B".

When the rotor 14 turns, the blades 82 thus make it possible to evacuate the heat stored in particular in the plates 60, 62 and the rotor 14 by circulating air inside the machine towards the openings in the bearings 22, 24. The plates 60, 62 therefore constitute internal fans. As a variant, only the plate 62 has blades.

According to one variant of the invention, which is not shown, the plates 60, 62 comprise other cooling means such as a heat pipe.

The shaft 16 may be a shaft which is shaped so as to constitute a heat pipe.

According to another aspect of the invention, the fixing holes 70 of the rear plate 62, which does not comprise counterbores 74, are threaded. The tie-rods 68 comprise a threaded end which is screwed into the threaded holes 70 of the rear plate 62 when mounting the rotor 14.

As a variant, the threaded end of the tie-rod is self-tapping so that the associated hole 70 of the plate 62 is smooth.

The holes 70 of the plate 62 are therefore fixing holes.

As a variant, the end of the tie-rod is smooth and passes through the associated hole 70 of the plate 62, the free end of the tie-rod being flattened in contact with the outer face of the plate 62 for fixing by means of riveting.

As a variant, the tie-rod is replaced by a bar which passes through the holes 70 of the plates 60, 62 and of the stack of laminations 32, the axial ends of the bar being flattened in contact with the outer faces of the plates 60, 62 for fixing by means of riveting.

According to one variant of the invention, which is not shown, at least one plate 60, 62 is formed of a first inner section and a second outer section. The first inner section is a disc which comprises openings for housing the coil ends. The inner radial face of the first inner section is pressed axially against the facing outer radial face of the stack of laminations 32. The second outer section is a disc, the inner radial face of which carries the bottoms 80 of the housings 78. The second outer section is arranged so that its inner radial face bears against the outer radial face of the first section. The outer radial face of the second outer section also optionally comprises the blades 82 forming a fan.

The mounting of the rotor 14 will now be described.

The stack of laminations 32 and the associated field coils 48 are mounted on the rotor shaft 16, here by means of a force fit. The plates 60, 62 are then arranged axially on either side of the stack of laminations 32 so that the coil ends 56 are received in the housings 78.

The threaded bar of the tie-rods 68 is then introduced axially into the fixing holes 70 of the front plate 60. The tie-rods 68 are then screwed into the threaded fixing holes 70 of the rear plate 62 until the housing 78 of each tie-rod 68 bears against the bottom of the associated counterbore of the front plate 60. The tie-rods 68 thus make it possible to axially clamp the stack of laminations 32 and the magnets 59 between the two plates 60, 62.

Then, during an impregnation operation, liquid impregnating varnish is introduced into the housings 78 of the rear plate 62 via the filling orifices 81.

The liquid varnish flows, at a greater or lesser speed depending on its viscosity, axially around the field coil 48 so as to reach the opposite housing 78 of the front plate 60. This operation lasts until the housings 78 of the two plates 60, 62, and in particular the space between the outer radial face 58 of the coil end 56 and the bottom 80, is filled with varnish.

The liquid varnish is then hardened by polymerization.

For this operation, the axis "B" of the rotor 14 is preferably oriented in such a way as to facilitate the flow of varnish by gravity, for example vertically.

Advantageously, during the operation of impregnation with varnish, the air contained in the housings 78 is evacuated. Since the impregnation operation is thus carried out in vacuo, each housing is filled with varnish in such a way that no bubbles of air or of any other gas exist in the housing 78. The transmission of heat by conduction between the coil end 56 and the associated plate 60, 62 is therefore optimal.

An operation of balancing the plates is then carried out. This operation consists for example in piercing holes or openings in the periphery of the outer radial face 72 of each plate 60, 62 so that the rotor 14 does not vibrate when it is driven in rotation.

During operation of such a rotor 14, the field coils 48 are heated. The heat of the field coils 48 is transmitted by conduction to the plates 60, 62 via the coil ends 56, the varnish and the bottom 80 of the housings 78.

It will be appreciated that the impregnation operation makes it possible to securely hold the coils 48 against the centrifugal force and to achieve good electrical insulation of the coils with respect to the stack of laminations 32.

The plates 60, 62 turn with the shaft 16 of the rotor 14. The blades 82 thus move the air. The blades 82 thus dissipate into the air the heat accumulated in the plate 60, 62. The heat is therefore effectively evacuated into the surrounding air via the blades 82. The surrounding air is renewed as a result of being moved and as a result of the turbulence induced by the blades 82. The blades 82 are thus kept at a temperature that is substantially lower than the heating temperature of the field coils 48.

The fact that the blades 82 are made of the same material as and in one piece with the associated plate 60, 62 ensures better evacuation of the heat by conduction from the plate 60, 62 to the blades 82.

The rate of evacuation of the heat is proportional to the contact surface between the coil ends 56 and the plates 60, 62. The fact that the bottom 80 of the housings 78 completely covers the coil end 56 in question therefore makes it possible to evacuate a large quantity of heat. In FIG. 1, the bottoms completely envelope the coil ends 56, apart from the orifices 81 which are subsequently closed.

According to one variant of the invention, which is not shown, the bottom 80 is shaped so as to increase the contact surface area between the bottom 80 and the coil end 56, for example with axial ribs.

Of course, the present invention is not limited to the examples of embodiments described.

Thus, it is possible to provide four tie-rods, namely one hole 70 per tie-rod. As a variant, two diametrically opposed tie-rods and two diametrically opposed heat pipes are provided, each heat pipe comprising a bar engaged in at least one hole 70 of one of the plates 60, 62 and at least in some of the holes of the stack of laminations 32 and opening to the exterior of the plate 60 or 62 in question. These heat pipes may pass completely through the plates 60, 62 and the stack of laminations and may be configured outside the plates so as to form fan blades. Such heat pipes are described for example in FIGS. 11A and 11B of the document FR 2 855 673, to which reference may be made. The arrangements of FIGS. 12, 13 and 24 of the document are also applicable.

The number of poles 40 depends on the specific application, as mentioned above.

As a variant, the fan plate 60, 62 is obtained by molding or forging or by the injection of plastic or metal.

It will be appreciated that, by virtue of the invention, the coil ends 56 are effectively cooled by the plates and that there is a greater freedom with regard to the design of the shape of the blades, the number of which may be increased. The air flow rate can be increased.

The cooling of the rotor is improved.

Furthermore, the balancing operation is made easier by virtue of the plates which also make it possible to reduce the number of fixing elements.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. A rotor of a rotary electric machine, comprising:
a rotor shaft mounted to rotate about its axis;
a stack of laminations which is mounted coaxially on said rotor shaft and which comprises at least two radially projecting poles;
a field coil which is wound around each pole so that axial end portions of said field coil, referred to as coil ends, project axially with respect to each outer axial end face of said stack of laminations; and
at least two plates for supporting said stack of laminations, said at least two plates being made of a heat-conductive material and which are arranged axially on either side of said stack of laminations so that the inner radial faces of said at least two plates bear against said outer axial end faces, respectively, of said stack of laminations, housings provided in said inner radial face of each plate to receive said coil ends;
wherein at least one of said housings has a contact surface with said outer axial end face of an associated coil end;
wherein one of said plates has a filling orifice which opens into a bottom of a housing so as to allow injection of a liquid varnish around two ends of said field coil.

2. A rotor of a rotary electric machine, comprising:
a rotor shaft mounted to rotate about its axis;
a stack of laminations which is mounted coaxially on said rotor shaft and which comprises at least two radially projecting poles;
a field coil which is wound around each pole so that axial end portions of said field coil, referred to as coil ends, project axially with respect to each outer axial end face of said stack of laminations; and
at least two plates for supporting said stack of laminations, said at least two plates being made of a heat-conductive material and which are arranged axially on either side of said stack of laminations so that the inner radial faces of said at least two plates bear against said outer axial end faces, respectively, of said stack of laminations, housings provided in said inner radial face of each plate to receive said coil ends;
wherein at least one of said housings has a contact surface with said outer axial end face of an associated coil end;
wherein one of said plates has a filling orifice which opens into a bottom of a housing so as to allow injection of a liquid varnish around two ends of said field coil,
wherein each plate is made of aluminum and wherein each plate has cooling means which are able to evacuate heat transmitted to said plate by said coil ends.

3. The rotor according to claim 2, wherein said cooling means comprise a fan with blades carried by an outer axial end face of said plate.

4. The rotor according to claim 3, wherein said blades are made of the same material as and in one piece with said plate.

5. The rotor according to claim 3, wherein said blades are distributed non-symmetrically around an axis of rotation of said rotor.

6. A rotor of a rotary electric machine, comprising:
a rotor shaft mounted to rotate about its axis;
a stack of laminations which is mounted coaxially on said rotor shaft and which comprises at least two radially projecting poles;
a field coil which is wound around each pole so that axial end portions of said field coil, referred to as coil ends, project axially with respect to each outer axial end face of said stack of laminations; and at least two plates for supporting said stack of laminations, said at least two plates being made of a heat-conductive material and which are arranged axially on either side of said stack of laminations so that the inner radial faces of said at least two plates bear against said outer axial end faces, respectively, of said stack of laminations, housings provided in said inner radial face of each plate to receive said coil ends;

wherein at least one of said housings has a contact surface with said outer axial end face of an associated coil end;

wherein at least one of said plates is made of at least a first inner section which comprises openings for passage of said coil ends and a second outer section which comprises a bottom for forming said housings with at least one opening of said first inner section.

7. A rotor of a rotary electric machine, comprising:

a rotor shaft mounted to rotate about its axis;

a stack of laminations which is mounted coaxially on said rotor shaft and which comprises at least two radially projecting poles;

a field coil which is wound around each pole so that axial end portions of said field coil, referred to as coil ends, project axially with respect to each outer axial end face of said stack of laminations; and at least two plates for supporting said stack of laminations, said at least two plates being made of a heat-conductive material and which are arranged axially on either side of said stack of laminations so that the inner radial faces of said at least two plates bear against said outer axial end faces, respectively, of said stack of laminations, housings provided in said inner radial face of each plate to receive said coil ends;

wherein at least one of said housings has a contact surface with said outer axial end face of an associated coil end;

wherein said plates are axially connected to one another by tie-rods of axial orientation, and in that said tie-rods are fixed by screwing via a threaded fixing hole which is formed in one of said plates.

* * * * *